(12) United States Patent
Li (10) Patent No.: US 12,079,062 B2
(45) Date of Patent: Sep. 3, 2024

(54) METHOD AND SYSTEM FOR PROVIDING POWER SAVING IN COMPUTER SYSTEMS

(71) Applicant: Quanta Computer Inc., Taoyuan (TW)

(72) Inventor: Yung-Fu Li, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 18/048,661

(22) Filed: Oct. 21, 2022

(65) Prior Publication Data
US 2024/0134442 A1 Apr. 25, 2024

(51) Int. Cl.
| G06F 1/32 | (2019.01) |
| G06F 1/3225 | (2019.01) |
| G06F 1/3234 | (2019.01) |
| G06F 1/3287 | (2019.01) |
| G06F 1/3203 | (2019.01) |

(52) U.S. Cl.
CPC .......... G06F 1/3287 (2013.01); G06F 1/3225 (2013.01); G06F 1/3275 (2013.01); *G06F 1/3203* (2013.01)

(58) Field of Classification Search
CPC ..... G06F 1/3287; G06F 1/3225; G06F 1/3275
USPC ........................................................ 713/320
See application file for complete search history.

(56) References Cited

U.S. PATENT DOCUMENTS

| 5,495,389 | A | 2/1996 | Dewitt et al. |
| 6,396,703 | B1 | 5/2002 | White |
| 7,070,431 | B1 | 7/2006 | White |
| 8,254,122 | B2 | 8/2012 | Chang |
| 11,847,095 | B1 * | 12/2023 | Bassov ................. G06F 16/162 |
| 2005/0122703 | A1 | 6/2005 | Fan et al. |
| 2005/0152122 | A1 | 7/2005 | Fan et al. |
| 2008/0109670 | A1 * | 5/2008 | Johansson ............. G06F 1/3287 |
| | | | 713/324 |
| 2010/0077240 | A1 * | 3/2010 | Daga ..................... G06F 1/3203 |
| | | | 711/E12.001 |

(Continued)

FOREIGN PATENT DOCUMENTS

| CN | 107072119 A | 8/2017 |
| CN | 111629552 A | 9/2020 |

(Continued)

OTHER PUBLICATIONS

TW Office Action for Application No. 112103995, mailed Jun. 8, 2023, w/ First Office Action Summary.

(Continued)

*Primary Examiner* — Volvick Derose
(74) *Attorney, Agent, or Firm* — NIXON PEABODY LLP (57) ABSTRACT

A system and method to save power in a computer system is disclosed. The system includes a power controller controlling connection of power to each of a plurality of memory components. A processor is coupled to the memory components. The processor operates with varying utilization levels of the memory components. A management controller is coupled to the processor and the power controller. The management controller determines a period of low utilization based on memory utilization data from the processor. The management controller commands the power controller to disable power to some of the plurality of memory components during the period of low utilization.

20 Claims, 5 Drawing Sheets

(56) References Cited

U.S. PATENT DOCUMENTS

| | | | |
|---|---|---|---|
| 2011/0029797 A1* | 2/2011 | Vaden | G06F 11/3055 |
| | | | 713/340 |
| 2011/0141838 A1* | 6/2011 | Kishibe | G11C 11/417 |
| | | | 365/226 |
| 2011/0145609 A1* | 6/2011 | Berard | G06F 1/3275 |
| | | | 711/147 |
| 2014/0049901 A1 | 2/2014 | Zhu | |
| 2014/0183317 A1 | 7/2014 | Li | |
| 2015/0280982 A1* | 10/2015 | Taniuchi | G06F 8/00 |
| | | | 709/202 |
| 2016/0224082 A1* | 8/2016 | Ohsawa | G11C 11/1659 |
| 2016/0242323 A1 | 8/2016 | Chen et al. | |
| 2016/0334861 A1* | 11/2016 | Dang | G06F 3/0625 |
| 2018/0067539 A1* | 3/2018 | Samson | G06F 1/3275 |
| 2018/0225066 A1* | 8/2018 | Alavoine | G06F 3/0659 |
| 2019/0129777 A1* | 5/2019 | Rangarajan | G06F 11/1076 |
| 2020/0192734 A1* | 6/2020 | Kao | H04L 65/1089 |
| 2020/0257627 A1* | 8/2020 | Chamarty | G06F 12/0811 |
| 2021/0365084 A1 | 11/2021 | Chang et al. | |
| 2022/0057848 A1 | 2/2022 | Chang et al. | |
| 2022/0171551 A1* | 6/2022 | Adsure | G06F 3/0679 |
| 2022/0206557 A1* | 6/2022 | Karthikeyan | G06F 1/3253 |
| 2022/0272859 A1 | 8/2022 | Zhang | |
| 2023/0036737 A1* | 2/2023 | Carbon-Ogden | G06N 3/0475 |
| 2023/0125240 A1* | 4/2023 | Wang | G06F 3/061 |
| | | | 711/154 |
| 2023/0307030 A1* | 9/2023 | Lu | G11C 11/40622 |

FOREIGN PATENT DOCUMENTS

| | | |
|---|---|---|
| CN | 216792811 U | 6/2022 |
| CN | 115666083 A | 1/2023 |
| EP | 2754967 A1 | 7/2014 |
| JP | 2000294965 A | 10/2000 |
| TW | 201205252 A | 2/2012 |
| TW | I549600 B | 9/2016 |
| TW | 201732618 A | 9/2017 |
| TW | 202129465 A | 8/2021 |
| TW | 202223883 A | 6/2022 |
| WO | 2012058951 A1 | 5/2012 |

OTHER PUBLICATIONS

TW Search Report for Application No. 112103995, mailed Jun. 8, 2023, w/ First Office Action.

TW Office Action for Applicatioin No. 112115549 mailed Jul. 2, 2024, w/ Second Office Action Summary, 8 pp.

TW Search Report for Application No. 112115549 mailed Jul. 2, 2024, w/ Second Office Action, 1 p.

\* cited by examiner

METHOD AND SYSTEM FOR PROVIDING POWER SAVING IN COMPUTER SYSTEMS

TECHNICAL FIELD

The present disclosure relates generally to power efficiency in computer systems. More particularly, aspects of this disclosure relate to routine that minimizes power to memory modules during low utilization periods to conserve computer system power.

BACKGROUND

Computer systems (e.g., desktop computers, blade servers, rack-mount servers, etc.) are employed in large numbers in various applications. Computer systems may perform general computing operations. A typical computer system such as a server generally includes hardware components such as processors, memory devices, network interface cards, power supplies, and other specialized hardware.

Servers are employed in large numbers for high demand applications such as network based systems or data centers. The emergence of the cloud for computing applications has increased the demand for data centers. Data centers have numerous servers that store data and run applications accessed by remotely—connected, computer device users. A typical data center has physical chassis structures with attendant power and communication connections. Each rack may hold multiple computing servers and storage servers. Each individual server has multiple identical hardware components such as processors, storage cards, network interface controllers, and the like.

Servers rely on processors for executing program instructions from various applications. Servers also use a baseboard management controller (BMC) to manage background operations such as power and cooling to allow maximum use of processors for applications. The BMC collects data on the operation of the computer system in various logs. For example, data relating to different hardware components is stored in a system event log (SEL) that may also be written on the flash memory device.

Thus, servers in modern data centers are a high-power consumption machine when used at full operational capability. However, in some applications, the components of a server are not always full utilized. For example, a mail server dedicated to an enterprise may not be busy from midnight to early morning, and on weekends. Another example of non-busy periods may be a server dedicated to stock trading applications for a bank. Such a server may be idle in the nights and on weekends when trading does not occur. Processors require access to rapid memory components such as dual in line memory modules (DIMMs). Such modules constitute random access memory (RAM) accessed by a processor to store data when the processor executes programming instructions. Such DIMMs require continual power to operate. Thus, the RAM of processors in a server is a high-power consumption component that remains powered on even when the processors are not being used. Such power to the RAM is still required during low or no use periods of the server, thus increasing power consumption requirements and costs for operating a data center.

Thus, there is a need for a method to save power required to operate a server during low utilization periods. There is also a need for a system that determines periods that allow certain memory components for a server to be powered down. There is also a need for a system that allows provision of only certain memory components during low utilization periods.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system to save power in a computer system is disclosed. The system includes a power controller controlling connection of power to each of a plurality of memory components. A processor is coupled to the memory components. The processor operates with varying utilization levels of the memory components. A management controller is coupled to the processor and the power controller. The management controller determines a period of low utilization based on memory utilization data from the processor. The management controller commands the power controller to disable power to some of the plurality of memory components during the period of low utilization.

A further implementation of the example system is an embodiment where the management controller is a baseboard management controller and the computer system is a server. Another implementation is where the power controller is a programmable logic device (PLD), a complex programmable logic device (CPLD), or an application specific integrated circuit (ASIC). Another implementation is where the system includes a platform controller hub coupled between the management controller and the processor. The platform controller hub collects the memory utilization data from the processor. Another implementation is where the memory components are dual in line memory modules (DIMMs). Another implementation is where the processor includes a memory controller that records utilization data. Another implementation is where the management controller determines a memory utilization level of the low utilization period. The power controller disables power to a subset of the plurality of the memory components proportional to the low utilization level. Another implementation is where the management controller is further operable to determine during a low utilization period whether the memory utilization of the processor exceeds the utilization level; and adjust the end time of the low utilization period. Another implementation is where the system includes a plurality of MOSFETs coupled to each of the memory components and a power source. The MOSFETs are controlled by the power controller to provide power to each of the memory components. Another implementation is where the management controller powers down the computer system before commanding the power controller to disable power to some of the plurality of memory components.

Another disclosed example is a method of controlling power to memory components in a computer system. Memory utilization data is collected from a processor operating with varying utilization levels of a plurality of memory components. A low utilization period is determined from the collected memory utilization data via a management controller. Power to at least some of the plurality of memory components is disabled during the low utilization period.

A further implementation of the example method is an embodiment where the management controller is a baseboard management controller and the computer system is a server. Another implementation is where the plurality of memory components is controlled by a programmable logic device (PLD), a complex programmable logic device (CPLD), or an application specific integrated circuit (ASIC). Another implementation is where the computer system includes a platform controller hub coupled between the management controller and the processor. The platform controller hub collects the memory utilization data from the processor. Another implementation is where the memory components are dual in line memory modules (DIMMs). Another implementation is where the method includes determining a memory utilization level of the low utilization period. The power controller disables power to a subset of the plurality of the memory components proportional to the low utilization level. Another implementation is where the method includes determining during the low utilization period whether the memory utilization of the processor exceeds the utilization level; and adjusting the end time of the low utilization period. Another implementation is where the computer system includes a plurality of MOSFETs coupled to each of the memory components and a power source. The MOSFETs are controlled to provide power to each of the memory components. Another implementation is where the method includes powering down the computer system before disabling power to some of the plurality of memory components.

Another disclosed example is a computer server having a random access memory including a plurality of dual in line memory modules (DIMMs). A processor is coupled to the plurality of DIMMs. The processor operates with varying levels of utilizing the random access memory. A programmable controller controls power to each of the plurality of DIMMs. A baseboard management controller is coupled to the processor and programmable controller. The baseboard management controller receives utilization data from the processor and determines a period of low memory utilization based on the utilization data. The baseboard management controller commands the programmable controller to disable power to some of the plurality of memory components during the period of low utilization.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure relates to a method and system for monitoring memory component power utilization and using the utilization data to disable power to unnecessary memory components during low utilization periods. Specifically, a management controller, such as a baseboard management controller (BMC), in a computer system, such as a server, monitors random access memory (RAM) utilization by processors, such as a CPU, to gather statistics when the utilization of the RAM is low. After gathering the statistics for utilization at different times, the BMC determines various low utilization periods for the processors. The BMC sends a command or a signal to a power controller, such as a Programmable Logic Device (PLD), to turn off power to some dual in-line memory modules (DIMMs) that compose the RAM at the beginning of a determined low utilization period. The BMC turns on power for all the DIMMs at the end of the low utilization periods for use by the processors. The system includes switches, such as as metal-oxide-semiconductor field-effect transistors (MOSFETs), that are coupled to a power source. The switches are controlled by the PLD to turn on and provide power to individual DIMMs based on the commands from the BMC. The switches are also controlled by the PLD to turn off and thus disable power to individual DIMMs based on commands from the BMC.

Figure 1:
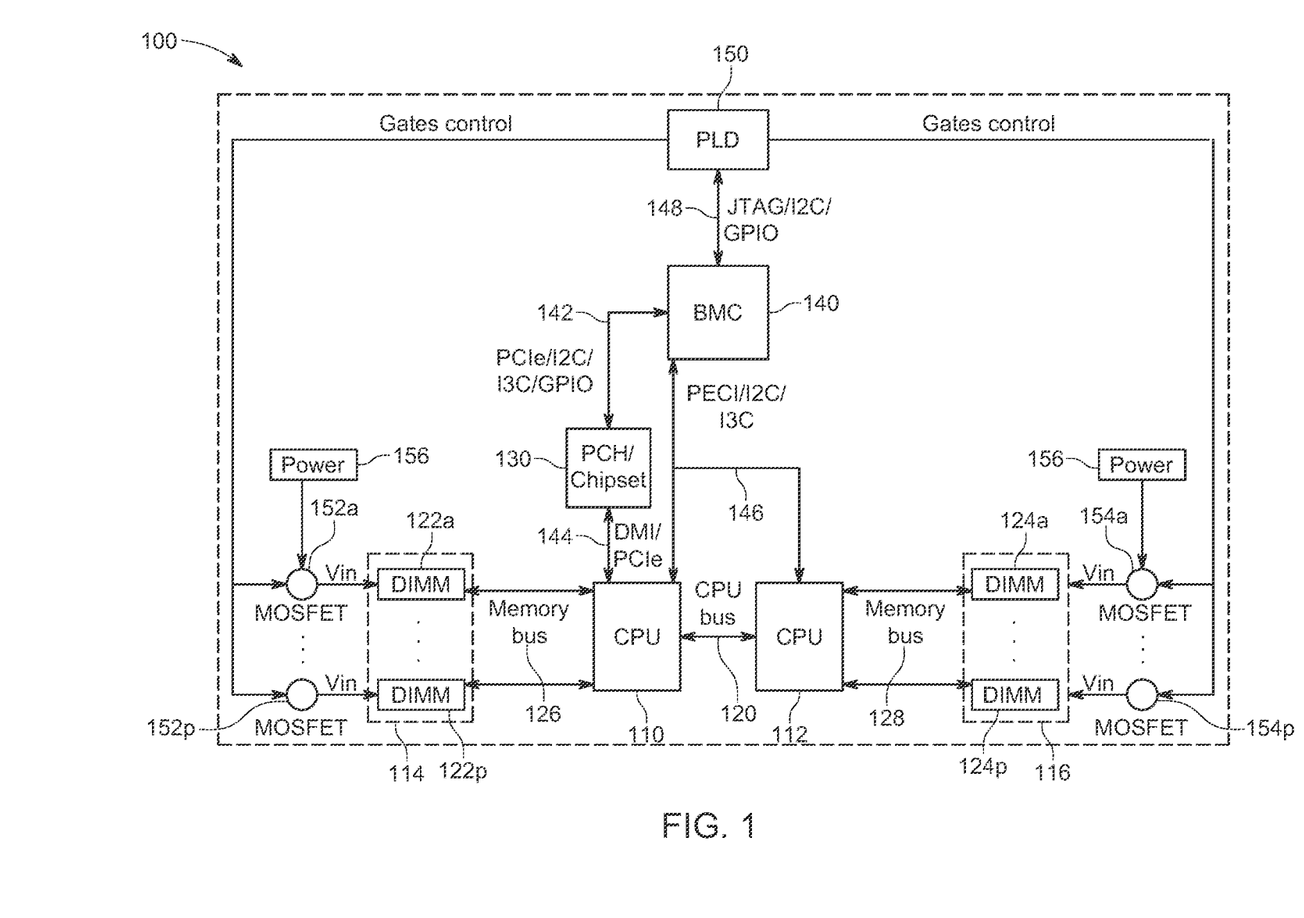
FIG. 1 is a block diagram of a computer system with a power control system for powering off memory components such as DIMMs during low utilization periods, according to certain aspects of the present disclosure.

The example system and method for energy saving from controlling power to memory components includes different hardware and software components. The hardware components are shown in FIG. 1. FIG. 1 a block diagram of the components of a computer system 100 that runs a routine to efficiently use power by selective powering of memory components. In this example, the computer system 100 is a server system, but any suitable computer device with processing devices and associated memory components can incorporate the principles disclosed herein. The computer system 100 has two processors or central processing units (CPU) 110 and 112. Each of the CPUs 110 and 112 operate with varying utilization levels of memory based on the needs of the computer system 100. For example, the CPUs 110 and 112 may execute applications frequently during certain times of the day resulting in high memory utilization levels. Other times of the day may result in little to no execution of applications, resulting in low memory utilization levels by the CPUs 110 and 112. The CPUs 110 and 112 may be those offered by Intel, AMD, or other processor architectures. The CPUs 110 and 112 in this example each have a built-in memory controller that can report current memory (RAM) utilization by the processor. Although only two CPUs are shown, additional CPUs may be supported by the computer system 100. Specialized functions may be performed by specialized processors such as a GPU or a field programmable gate array (FPGA) mounted on a motherboard or on an expansion card in the computer system 100.

The two CPUs 110 and 112 have access to respective banks of dual in line memory modules (DIMMs) 114 and 116. In this example, the DIMMs bank 114 constitute the random access memory (RAM) for the processor 110 while the DIMM bank 116 constitutes the random access memory for the processor 112. Other processing devices may also have similar banks of DIMMs for associated RAM. In this example, the DIMM bank 114 has 16 DIMMs 122(a)-122(p). The DIMM bank 116 has 16 DIMMs 124(a)-124(p). In this example, the RAM accessible by the CPUs 110 and 112 are composed of the 16 DIMMs in the respective banks 114 and 116. In this example, each DIMM constitutes 32 GB of RAM thus, each of the banks 114 and 116 constitute a total of 512 GB of RAM. In this example, the DIMMs in the banks 114 and 116 are DDRS RAM chips with a power input pin (Vin). In order for the DIMMs to function, power must be continually connected to the power input pin. When an individual DIMM is connected to power, it consumes power during the entire time. If power is disconnected or disabled to an individual DIMM, the DIMM stops consuming power. Of course different numbers of DIMMs may be supplied for other sizes of desired RAM. Alternatively or additionally, DIMMs of greater or less storage size may be used.

The CPUs 110 and 112 may communicate with each other via a CPU bus 120. A memory bus 126 allows communication between the CPU 110 and the DIMMs in the DIMM bank 114. A memory bus 128 allows communication between the CPU 112 and the DIMMs in the DIMM bank 116.

A platform controller hub (PCH) 130 facilitates communication between the CPUs 110 and 112 and other hardware components such as serial advanced technology attachment (SATA) devices, Open Compute Project (OCP) devices, and USB devices. The PCH (Platform Controller Hub)/Chipset that constitutes the PCH 130 may be an Intel PCH chip set or other control integrated circuits.

The SATA devices may include hard disk drives (HDD)s. Alternatively, other memory storage devices such as solid state drives (SSD)s may be used. Other hardware components such as PCIe devices may be directly accessed by the CPUs 110 or 112 through expansion slots (not shown). The additional PCIe devices may include network interface cards (NIC), redundant array of inexpensive disks (RAID) cards, field programmable gate array (FPGA) cards, and processor cards such as graphic processing unit (GPU) cards.

A baseboard management controller (BMC) 140 manages operations, such as power management and thermal management, for the computer system 100. The BMC 140 has access to a dedicated BMC memory device that is a flash memory device. In this example, the BMC 140 communicates with the PCH 130 through different channels 142 that may include peripheral component interconnect express (PCIe), I2C, I3C, SMBus, and general purpose input/output pins (GPIO) lines. In this example, the PCH 130 may include a series of SMBus pins for communicating with the BMC 140 through the channels 142 for memory utilization data. The PCH 130 may communicate with the CPU 110 through a Direct Media Interface (DMI)/PCIe bus 144. The BMC 140 includes firmware that receives different messages from hardware components in the computer system 100. The messages are stored in system logs such as a system event log (SEL) or a BMC console log. In this example, the BMC 140 can read for RAM utilization data from processors such as the CPUs 110 and 112 from the PCH 130 in accordance with a routine that may be either in BMC firmware or stored on the flash memory device. Such data may be stored by the BMC 140 for later analysis of high and low memory utilization by the processors.

A power controller, such as a programmable logic device (PLD) 150, controls a bank of switches, such as metal-oxide-semiconductor field-effect transistor (MOSFET)s 152a-152p, for providing power from a power source 156 to the DIMMs 122a-122p of the DIMM bank 114. MOSFETs are used for switching in this example for cost and efficiency, but other switching types may be used instead of a MOSFET. In this example, the MOSFETs 152a-152p control the connection of the power source 156 to the power input of the individual DIMMs 122a-122p. This allows power to be supplied or disabled to the respective DIMMs by receiving a signal from a gate control pin on the PLD 150 connected to the gates of the respective MOSFETs 152a-152p. Thus, the PLD 150 includes 16 respective control pins for controlling each of the MOSFETs 152a-152p. The PLD 150 also controls a bank of switches such as MOSFETs 154a-154p for providing power from the power source 156 to each of the DIMMs 124a-124p of the DIMM bank 116. Although in this example the power controller is a PLD, any other suitable programmable device or logic device such as a complex programmable logic device (CPLD) or an application specific integrated circuit (ASIC) may be used for the power controller.

The BMC 140 executes a routine to monitor utilization of RAM by both of the processors 110 and 112. After sufficient utilization data is collected, the BMC 140 may determine low utilization periods of the processors 110 and 112. The BMC 140 may control the PLD 150 to provide power to certain of the DIMMs in the DIMM banks 114 and 116 during the determined low utilization periods to reduce the available RAM to appropriate utilization levels. Unnecessary individual DIMMs may be powered down during low utilization periods, thus saving power during such periods.

In this example, the BMC 140 operates from standby power and thus is powered when the rest of the components of the system 100 are powered down. The BMC 140 executes firmware code to read RAM utilization data directly from the CPUs 110 and 112 through a communication bus 146. In this example, the communication bus 146 may allow I2C/I3C/SMBus or PECI (Platform Environment Control Interface) communication. Alternatively, the RAM utilization data may be read from the PCH 130 by the BMC 140. In this example, the BMC 140 reads the RAM utilization in the process of power up of the system 100.

A communication bus 148 allows the BMC 140 to communicate with PLD 150. In this example, the communication bus 148 allows Joint Test Action Group (JTAG), I2C, or GPIO communications. As will be explained, the BMC 140 may power on or power off the system 100 by sending a signal on an I/O control pin to the PCH 130 via the channels 142 or the PLD 150 via the bus 148. The BMC 140 may also request the PLD 150 to turn power off/on to individual DIMMs in the banks 114 and 116 via the bus 148.

In this example, the power controller 150 is a Programmable Logic Device (PLD), a Complex Programmable Logic Device (CPLD), or an application specific integrated circuit (ASIC). The controller 150 is powered by standby power and can receive request from the BMC 140. The controller 150 then controls power input to the individual DIMMs in the banks 114 and 116 via signals sent over gate control pins. The gate control pins are connected to the gates of the associated MOSFETs 152a-152p and 154a-154p.

The software component of the power saving system includes code or logic executed by the BMC 140 and the PLD 150. Such software may be embedded in the actual hardware, on-board memory, or external memory such as flash memory. In the BMC code, the software has capabilities to read RAM utilization data from an internal memory controller in the CPUs 110 and 112 or a Management Controller (ME) built into the PCH 130. The BMC code also may be executed by the BMC 140 to collect, analyze, and determine when RAM utilization is low or high for the respective CPU 110 and 112. The BMC code allows powering on and off the server system by sending signals from a GPIO (General Purpose Input/Output) pin connected to the PCH 130 or the PLD 150. As explained above, the BMC code also allows controlling the PLD 150 through GPIOs pins to turn off/on specific DIMMs in the banks 114 and 116.

The code executed by the BMC 140 reads RAM utilization directly from the CPUs or indirectly from a management controller (ME) in the PCH 130. Initially, the code executed by the BMC 140 collects utilization data, analyzes the data, and determines time periods when the RAM utilization is low or high for each processor. The utilization data is collected over a set period of time such as several days to reliably determine memory utilization levels for the processors. After collection of sufficient utilization data, different low memory utilization periods may be determined. The BMC code may determine how many DIMMs should be turned off according to how low the RAM utilization level is during the period of low RAM utilization. For example, if the RAM utilization is always lower than 20%, or the average utilization is lower than 20% during a certain period, the BMC 140 will request the PLD 150 to turn off approximately 80% of DIMMs in a DIMM bank.

At the beginning of a predicted low utilization period, the BMC 140 will power off and on system 100 by the GPIO pin connected to the PCH 130 or the PLD 150. The PCH 130 or PLD 150 will power off and power on the computer system 100 accordingly. After power off, the BMC 140 will then command the PLD 150 to turn off or turn on specific DIMMs by sending a command or controlling GPIO pins to the PLD 150. The specific number of DIMMs that are turned off may match the maximum utilization of RAM or the average utilization of RAM during the low utilization period. The BMC 140 logs a message and/or informs an operator when and why the BMC 140 turns off/on specific DIMMs. The BMC 140 then turns on system power and thus only a few DIMMs are powered for the low utilization period.

The PLD code or logic design of the PLD 150 allows the PLD 150 to receive commands or I/O pin signals from the BMC 140 and take corresponding actions such as sending power on or power off signals to the MOSFETs to control power to individual DIMMs. The code allows the PLD 150 to translate the commands to sending signals to the MOSFETs and respond to BMC. The code allows sending signals of different voltages to be output on each of the pins connected to the gates of the MOSFETs to turn on/off power to specific DIMMs. The code or logic design also allows sending response signals to the BMC 140 to confirm the PLD 150 performing the commands successfully.

Figure 2A:
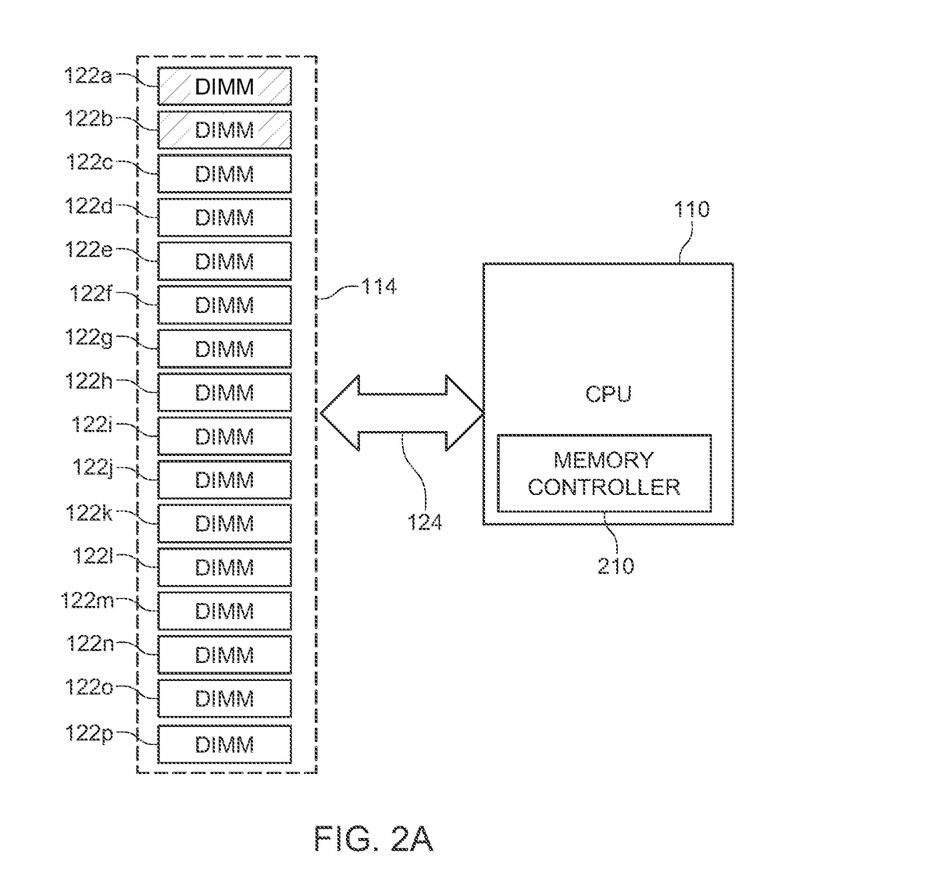
FIG. 2A is a diagram showing the power commands to different DIMMs in the computer system in FIG. 1 to match a utilization level during a first low utilization period, according to certain aspects of the present disclosure.

FIG. 2A shows an example of powering of different DIMMs in the system 100 in FIG. 1 during a first low utilization period based on analysis performed by the BMC 140. For simplicity, only the CPU 110 and the DIMMs 122a-122p of the DIMM bank 114 are shown in FIG. 2A. As explained above, the RAM utilization data is derived from a built-in memory controller 210 in the CPU 110. The memory controller 210 tracks RAM utilization and may be read by the BMC 140 or the PCH 130. In this example, the BMC 140 has determined that a low utilization period occurs between 12:00 AM and 6:00 AM based on the collected RAM utilization data. The BMC 140 also determines that the maximum utilization is 10% of RAM during the low utilization period. Thus, the BMC 140 powers down the computer system 100 at the beginning of the low utilization period. After the power down, the BMC 140 commands the PLD 150 to power sufficient DIMMs via the MOSFETs to provide 10% of the total memory during the period. Thus, only DIMMs 122a and 122b are turned on (shaded in FIG. 2A) via the MOSFETs 152a-152b. The remaining DIMMs 122c-122p are powered off via the MOSFETs 152c-152p. The BMC 140 then powers up the system 100 and power saving is realized from the power no longer required by the remaining DIMMs 122c-122p.

Figure 2B:
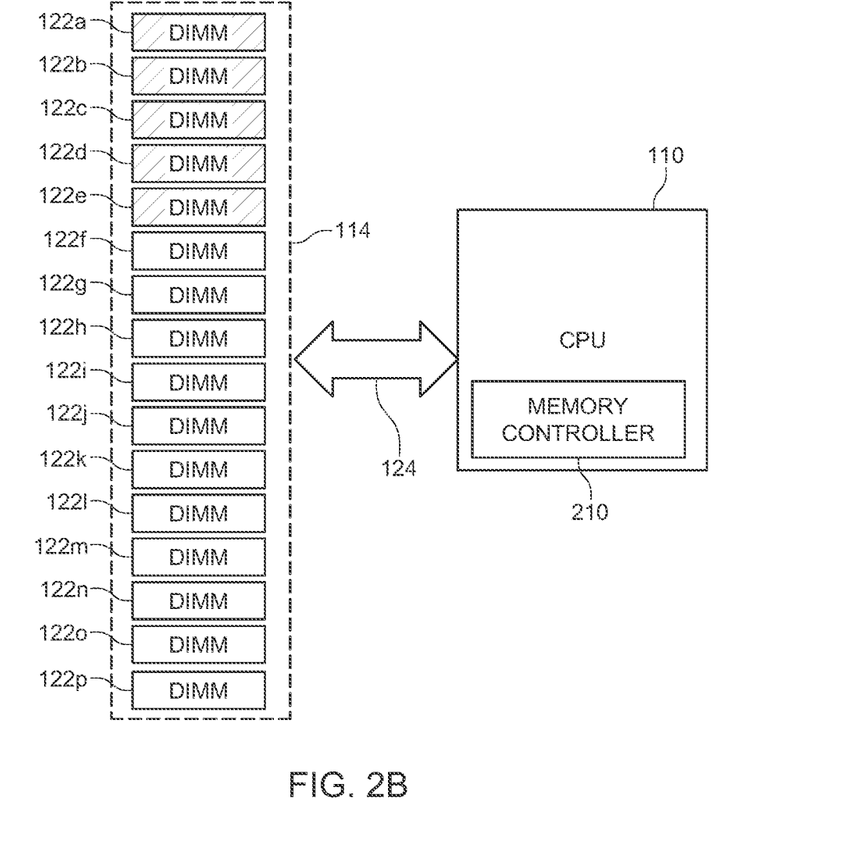
FIG. 2B is a diagram showing the power commands to different DIMMs in the computer system in FIG. 1 to match a different utilization level during a second low utilization period, according to certain aspects of the present disclosure.

FIG. 2B shows another example of powering of DIMMs in the system 100 during a second utilization period based on analysis performed by the BMC 140. In this example, the BMC 140 has determined that a second low utilization period occurs between 9 PM and 11 PM based on the collected RAM utilization data. The BMC 140 also determines that the maximum utilization is 30% of RAM during the low utilization period. Thus, the BMC 140 powers down the computer system 100 at the beginning of the low utilization period. The BMC 140 commands the PLD 150 to power sufficient DIMMs to provide 30% of the total memory during the period. Thus, only DIMMs 122a, 122b, 122c, 122d, and 122e are turned on (shaded in FIG. 2B). The remaining DIMMs 122f-122p are powered off. The BMC 140 then powers up the system 100 and power saving is realized from the power no longer required by the remaining DIMMs 122f-122p.

Figure 2C:
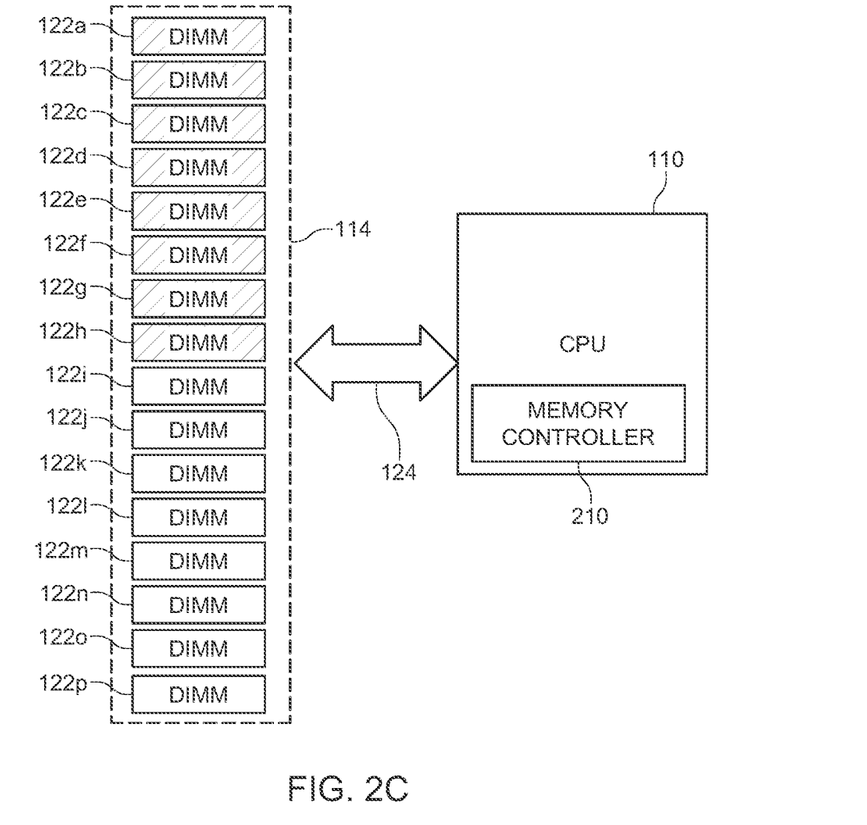
FIG. 2C is a diagram showing the power commands to different DIMMs in the computer system in FIG. 1 to match a different utilization level during a third low utilization period, according to certain aspects of the present disclosure.

FIG. 2C shows another example of powering of DIMMs in the system 100 during a third utilization period. In this example, the BMC 140 has determined that a low utilization period occurs between 6 PM and 9 PM based on the collected RAM utilization data. The BMC 140 also determines that the maximum utilization is 50% of RAM during the low utilization period. Thus, the BMC 140 powers down the computer system 100 at the beginning of the low utilization period. The BMC 140 commands the PLD 150 to power sufficient DIMMs to provide 50% of the total memory during the period. Thus, only DIMMs 122a-122h are turned on (shaded in FIG. 2C). The remaining DIMMs 122i-122p are powered off. The BMC 140 then powers up the system 100 and power saving is realized from the power no longer required by the remaining DIMMs 122i-122p.

Figure 3:
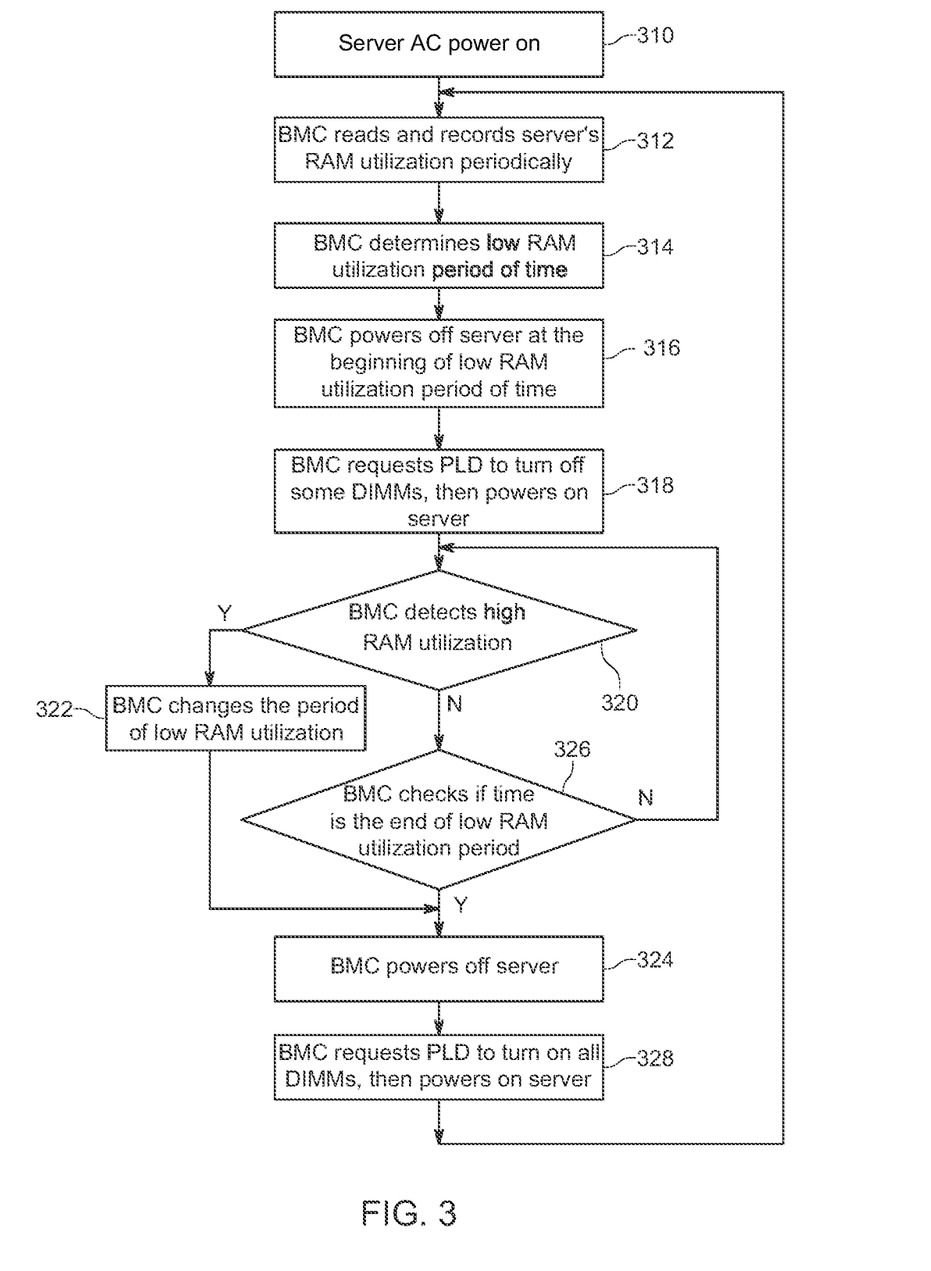
FIG. 3 is a flow diagram of a routine executed by the BMC to control power to memory components in the computer system in FIG. 1, according to certain aspects of the present disclosure.

FIG. 3 is a flow chart of the utilization data collection and memory power control routine executed by the BMC 140 in FIG. 1. The above described routine in FIG. 3 is representative of example machine-readable instructions for the BMC 140 in FIG. 1 to determine low utilization periods and control power to memory components. In this example, the machine-readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can, alternatively, be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic device, etc.). For example, any or all of the components of the routines can be implemented by software, hardware, and/or firmware. Also, some or all of the machine-readable instructions represented by the flowcharts may be implemented manually. Further, although the example routine is described herein, persons of ordinary skill in the art will readily appreciate that many other methods of implementing the example machine-readable instructions may alternatively be used.

The computer system is first powered on (310). After the system powers on, the BMC 140 reads RAM utilization data periodically either directly from each CPU or indirectly through the PCH (312). For example, the BMC 140 may read RAM utilization data every minute for each of the CPUs.

The BMC 140 collects the RAM utilization data for an extended period of time, for example a week, and then determines the periods of time when RAM utilization is low (314). The BMC 140 powers off the system at the beginning of a low RAM utilization period of time (316). The BMC 140 then commands the PLD 150 to turn off power to some DIMMs according to the maximum utilization of RAM during the low utilization period (318). The BMC 140 then powers on the system.

The system thus runs with lower power consumption in the low RAM utilization period since some DIMMs are turned off. The BMC 140 periodically detects whether RAM utilization exceeds the set level of utilization during the determined period of low RAM utilization (320). The detection criteria may be a threshold utilization level over the set level or a predetermined time the processor is over the utilization level. If the utilization exceeds the set level of utilization, the BMC 140 changes the determined times of the low RAM utilization period (322). The BMC 140 then powers off the system (324). If the utilization does not exceed the set level of utilization, the BMC checks it the end of the utilization period has been reached (326). If the end of the utilization period has not been reached, the routine loops back to checking the level of utilization (320). If the end of the utilization period has been reached, the BMC 140 then powers off the system (324).

After the BMC 140 powers off the system, the BMC 140 commands the PLD 150 to turn on all DIMMs, and then powers on the system (328). Thus, the system is running with higher power consumption in the high RAM utilization period. The routine repeats the above steps to adjust the low RAM utilization periods, and turn off DIMMs dynamically during those periods to save power during low RAM utilization periods.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A power saving system in a computer system, the power saving system comprising:
   a power controller controlling connection of power to each of a plurality of memory components;
   a processor coupled to the plurality of memory components, the processor operating with varying utilization levels of the plurality of memory components; and
   a management controller coupled to the processor and the power controller, the management controller operable to:

collect memory utilization data from the processor over a period of time;
determine a future period of low utilization based on the collected memory utilization data from the processor;
command the power controller to disable power to some of the plurality of memory components during the future period of low utilization;
determine during the future period of low utilization whether the memory utilization of the processor exceeds a low memory utilization level; and
adjust the end time of the future period of low utilization.

2. The power saving system of claim 1, wherein the management controller is a baseboard management controller and the computer system is a server.

3. The system of claim 1, wherein the power controller is a programmable logic device (PLD), a complex programmable logic device (CPLD), or an application specific integrated circuit (ASIC).

4. The power saving system of claim 1, further comprising a platform controller hub coupled between the management controller and the processor, the platform controller hub collecting the memory utilization data from the processor.

5. The power saving system of claim 1, wherein the plurality of memory components are dual in line memory modules (DIMMs).

6. The power saving system of claim 1, wherein the processor includes a memory controller that records the memory utilization data.

7. The power saving system of claim 1, wherein the management controller determines the low memory utilization level of the period of low utilization, wherein the power controller disables power to a subset of the plurality of the memory components that is proportional to the low memory utilization level.

8. The power saving system of claim 7, wherein the management controller is further operable to:
determine during the period of utilization whether the memory utilization of the processor exceeds the low utilization level; and
adjust the end time of the period of low utilization.

9. The power saving system of claim 1, further comprising a plurality of metal- oxide-semiconductor field-effect transistors (MOSFETs) each coupled to one of the plurality of memory components and a power source, wherein the MOSFETs are controlled by the power controller to provide power to each of the plurality of memory components.

10. The power saving system of claim 1, wherein the management controller powers down the computer system before commanding the power controller to disable power to some of the plurality of memory components.

11. A method of controlling power to memory components in a computer system, the method comprising:
collecting memory utilization data from a processor operating with varying utilization levels of a plurality of memory components over a period of time;
determining a future low utilization period from the collected memory utilization data via a management controller;
disabling power to at least some of the plurality of memory components during the future low utilization period;
determine during the future low utilization period whether the memory utilization of the processor exceeds a low memory utilization level; and
adjust the end time of the future low utilization period.

12. The method of claim 11, wherein the management controller is a baseboard management controller and the computer system is a server.

13. The method of claim 11, wherein the plurality of memory components is controlled by a programmable logic device (PLD), a complex programmable logic device (CPLD), or an application specific integrated circuit (ASIC).

14. The method of claim 12, wherein the computer system includes a platform controller hub coupled between the management controller and the processor, the platform controller hub collecting the memory utilization data from the processor.

15. The method of claim 11, wherein the plurality of memory components are dual in line memory modules (DIMMs).

16. The method of claim 11, further comprising determining a memory utilization level of the low utilization period, wherein the power controller disables power to a subset of the plurality of the memory components that is proportional to the memory utilization level.

17. The method of claim 16, further comprising:
determining during the low utilization period whether the memory utilization of the processor exceeds the memory utilization level; and
adjusting an end time of the low utilization period.

18. The method of claim 11, wherein the computer system includes a plurality of metal-oxide-semiconductor field-effect transistors (MOSFETs) each coupled to one of the plurality of memory components and a power source, wherein the MOSFETs are controlled to provide power to each of the plurality of memory components.

19. The method of claim 11, further comprising powering down the computer system before disabling power to some of the plurality of memory components.

20. A computer server comprising:
a random access memory including a plurality of dual in line memory modules (DIMMs);
a processor coupled to the plurality of DIMMs, the processor operating with varying levels of utilizing the random access memory;
a programmable controller controlling power to each of the plurality of DIMMs; and
a baseboard management controller coupled to the processor and programmable controller, the baseboard management controller operable to:
receive utilization data from the processor;
collect memory utilization data from the processor over a period of time;
determine a future period of low memory utilization based on the utilization data;
command the programmable controller to disable power to some of the plurality of memory components during the future period of low memory utilization;
determine during the future low utilization period whether the memory utilization of the processor exceeds a low memory utilization level; and
adjust the end time of the future low utilization period.

* * * * *